United States Patent [19]

Leung et al.

[11] Patent Number: 4,857,593

[45] Date of Patent: Aug. 15, 1989

[54] PROCESS FOR PROCESSING THERMOPLASTIC POLYMERS

[75] Inventors: Pak S. Leung, Highland Mills, N.Y.; Errol D. Goddard, Haworth; Fred H. Ancker, Warren, both of N.J.

[73] Assignee: Union Carbide Corporation, Danbury, Conn.

[21] Appl. No.: 165,536

[22] Filed: Mar. 8, 1988

[51] Int. Cl.$^4$ .............. C08L 53/00; C08L 83/00; C08L 63/00; C08L 51/08

[52] U.S. Cl. .............. 525/92; 525/63; 525/104; 525/106; 525/113; 525/120; 525/121; 525/462; 525/463; 525/464; 525/468; 525/474; 525/535; 525/536; 524/121; 524/126; 524/127; 524/128; 524/130; 524/131; 524/133; 524/154; 524/188; 524/261; 524/262; 524/265; 524/241; 524/243; 524/251; 524/252; 524/155; 524/156; 524/157; 524/159; 524/167

[58] Field of Search .............. 525/92, 106, 113, 63, 525/104, 464, 468, 462, 474, 536, 535, 120, 121, 463; 524/121, 126, 127, 128, 130, 131, 133, 154, 261, 262, 265, 241, 243, 251, 252, 188, 155, 156, 157, 167, 159

[56] References Cited

U.S. PATENT DOCUMENTS

| | | | |
|---|---|---|---|
| 3,100,197 | 8/1963 | Heuck et al. | 524/121 |
| 4,221,728 | 9/1980 | Jaquiss et al. | 525/464 |
| 4,481,338 | 11/1984 | Serini et al. | 525/468 |
| 4,498,929 | 2/1985 | Robertson | 524/262 |
| 4,722,955 | 2/1988 | Dick | 524/141 |

Primary Examiner—Lewis T. Jacobs
Attorney, Agent, or Firm—Paul W. Leuzzi

[57] ABSTRACT

A process for enhancing the fabrication of thermoplastic polymers entailing the addition of from 0.01 to 1 part, per hundred parts of thermoplastic polymer, of a processing aid, said processing aid comprising a processing additive, such as a silicone or a polyol, and a processing adjuvant, such as a phosphate.

28 Claims, No Drawings

PROCESS FOR PROCESSING THERMOPLASTIC POLYMERS

BACKGROUND OF THE INVENTION

1. Field of The Invention

The present invention relates to an improved process for processing thermoplastic polymers in various types of fabrication equipment. More particularly, the present invention provides a processing aid comprising, at least, a processing additive and a processing adjuvant. The processing additive is a polymeric material having an hydroxy, alkoxy, epoxy, carboxy or amino group. The processing adjuvant contains at least two monofunctional groups or at least one multifunctional group wherein at least one functional group provides preferential adsorption over the processing additive for the fabrication surface and wherein at least one other functional group is capable of bonding with the processing additive.

2. Prior Art

The manufacture of thermoplastic parts by melt fabrication processes such as extrusion and molding is generally not possible using neat polymers directly as synthesized. Instead, it is common practice to "formulate" compositions containing a variety of ingredients in relatively small, but critical amounts. These ingredients may be categorized into two main and fairly distinct groups, namely product additives and processing aids.

The product additives, which primarily serve the function of modifying the properties of the fabricated material, include pigments and dyes (colorants), heat stabilizers and antioxidants, light and UV stabilizers, antistatic agents, slip and antiblocking agents, and the like.

The processing aids primarily, if not exclusively, facilitate processing—often to the point that processing would be impossible without them. Foremost among these aids are lubricants, sometimes referred to as release agents, which prevent sticking of the hot molten thermoplastic polymer to fabrication surfaces such as extruder screws, extrusion dies, mill and calender rolls, injection molds, and the like. In addition, lubricants can have many other beneficial functions in the processing of molten thermoplastic polymers. In spite of the often critical importance of these processing aids to the thermoplastic fabrication industry, interface effects in polymer melt flow have received scant attention in the past and little is still known regarding the chemistry and physics of boundary phenomena. In fact, even in the determination of melt viscosity the principal material parameter of polymer melt flow the interface effects are usually ignored by the expediency of assuming that the polymer melt velocity always is zero at the solid boundary.

Recent studies of "melt fracture", a flow instability phenomenon occurring at high flow rates during extrusion of thermoplastic polymers, demonstrate the importance of the "micro rheology" the fabrication surface/polymer melt boundary. Several mechanisms have been proposed for the occurrence of gross melt fracture and there is no general agreement on either the mechanism or the site of initiation of this defect. The melt fracture phenomenon manifests itself by severe surface irregularities in the extrudate as it emerges from the die. For a given polymer/die material combination, flow geometry and processing temperature, the surface defects occur above a critical nominal shear stress. In polyethylene, melt fracture has now persuasively been attributed to a breakdown in the adhesion between the polymer melt and the rigid die surface in the "land" (exit) region of the die (A. V. Ramamurthy, J. Rheology, 30(2), 337–357, 1986 and Advances in Polymer Technology, 6(4 , 489–499, 1986). In a further development, it has now also been shown that the introduction of a liquid additive, tailored so as to be strongly bonded to the die surface, yet "compatible" with the polymer melt, allows dramatic increases in flow rates before the surface defects typical of melt fracture are incurred (W.B. Herdle and W. A. Fraser, "Improvements in Blown Film Extrusion of Polyolefins Containing a Novel Processing Aid", Society of Plastics Engineers, Los Angeles, Calif., May 1987).

It is noteworthy that in both cases, the chemistry and the micro rheology at the boundary between the polymer melt and the solid fabrication surface greatly overshadowed the effects of other relevant variables such as the details of the die geometry and of the molecular architecture of the polymer.

The problems of melt fracture during high rate extrusion of polyolefins have in the past been alleviated by the use of fluorocarbon compounds (e.g. duPont: Viton A), fluoroelastomers (e.g. 3M: Dynamar PPA 2231 , sulfonated fluorocarbon polymers and fluoroalkyl sulfonates (Mitsui, Japanese Patent 59/11358, June 29, 1984 ; refer also to the article by Rudin, Worm and Blacklock in Plastics Engineering, 63–66, Mar. 1986. These processing aids are effective in reducing melt fracture in the extrusion of polyolefins, especially linear low density polyethylene, which are particularly prone to melt fracture. The main problems arising in the commercial use of these processing aids are difficulties in dispersion of the processing aid and a tendency for plate out of decomposed substances on the extruder screw and/or the die lips. The plate out is often severe, requiring shut down of the equipment and extensive clean-ups. In addition, fluorocarbon materials are inherently expensive.

Another approach is described in U.S. Pat. No. 4,535,113. This invention discloses organo modified silicone processing aids which effectively reduce melt fracture and have been shown to improve through put under static power conditions, yet do not have the drawback of plate- out. Unfortunately, the performance of these organo modified silicone compounds is often greatly diminished in the presence of certain other thermoplastic additives such as zinc stearate, which commonly are used as mold release agents and as inhibitors for the discoloration of polyolefin products. This interference by conventional additives used in the commercial manufacture of polyolefins is a drawback to their general utility.

A still third approach relies on a change in the extrusion die materials of construction to a metal or alloy showing better wetting and adhesion to molten polyolefins than do standard steel or chrome plated dies (U.S. Pat. Nos. 4,552,776; 4,552,712 and 4,554,120). Although this "hardware" solution works, the metals showing improvements in alleviating melt fracture are quite soft (e.g. copper alloys), hence their use is limited in manufacturing situations due to the high risk of damage. Besides, new equipment and shut downs for repair are costly.

The most common reason for using lubricants is to reduce the tendency for a thermoplastic polymer to stick to the hot metal surfaces of dies, molds and rolls. A great variety of chemicals, oils, waxes and soaps have and are being used in different thermoplastic polymers, refer for example to the review in E. W. Flick: "Plastic Additives", Noyes Publications, Park Ridge, N.J. 1986, especially Section XII on lubricants. Another general overview is given by G. Illmann in an article entitled "Waxes As Lubricants In Plastics Processing", SPE Journal, pp. 71–76, 121, 1967. See also U.S. Pat. No. 4,371,476. In addition to securing release of the thermoplastic polymer from a hot metal surface, commercial lubricants must meet a number of other criteria such as freedom from objectionable odors, freedom from making clear plastics hazy or opaque, freedom from exuding to the surface and making it tacky or waxy, etc. In isolated instances, certain lubricants have been observed to contribute to alleviating some of the other processing problems enumerated above. For example, Japanese Pat. No. 59/46527, Nov. 13, 1984 notes that certain polycarbonyl compounds alleviate the plate out on hot rollers of a barium soap stabilizer in PVC; P. L. Shah in a paper entitled "Influence of Shear Dependent Lubricant Characteristics on Melt Rheology of PVC", Soc. Plastics Engineers, Tech Papers, 17, 321–325, 1971, states that stearic acid reduces melt fracture in plasticized PVC; Rudin et al, referred to above, noted that polyolefins could be extruded at lower back pressures and/or higher throughput rates in the presence of fluorocarbon lubricants; Japanese Pat. No. 49/15948, Apr. 18, 1974 noted that poly(dimethyl siloxane) increased the output and lowered the power requirements in extrusion of polyethylene; Duska, Gasior and Pomper in a paper entitled "Effects of Grooved Feed Throat on Extruder Performance", Soc. Plastics Engineers, Techn. Papers, 21, 434–438, 1975 reported in a study covering seven plastics that in each case a maximum lubrication level existed above which the extruder would not feed (screw fouling), even with a grooved barrel section. References to solving other processing problems through the use of lubricants or other processing aids are sparse or non-existent.

In summary, in the prior art, practical solutions to the processing problem of "sticking" have generally been achieved for all of the major thermoplastics. On the other hand, solutions to the problem of melt fracture have so far been achieved only with the concomitant creation of other problems such as dispersion difficulties of the fluorocarbons, plate-out of decomposition products, high cost, and sensitivity to other plastic additives. Other processing improvements, such as alleviation of surface defects in the extrusion and/or molding of filled thermoplastics, reduction in the pressure-to-fill during injection molding, increase of output rates and reduction of power consumption during extrusion, all without plate-out and exudation of the processing aid, have only met with very limited success and then only in isolated instances.

In contrast, the formulated processing aids of the present invention constitute a new class of versatile processing aids which are broadly useful and very superior to the conventional lubricants and plastic additives of the prior art as will be shown in the following examples.

Thus, there continues a need for an economical solution to the problem which is both satisfactory in terms of processing and yet versatile enough to accommodate a variety of thermoplastic resin systems.

OBJECTS OF THE INVENTION

It is a primary object of the present invention to provide a processing aid which will enhance the processability of thermoplastic polymers.

Another object of the present invention is to reduce the power consumption, operating pressure and fabrication temperature of the process without adversely affecting the physical properties of the fabricated product.

Yet another object of the present invention is to reduce plate out and residue problems.

Another object of the present invention is to develop a processing aid which tolerates the influence of other additives commonly employed in the fabrication of thermoplastic polymers, and particularly zinc stearate.

Other objects of the invention will be made apparent from the description and examples which follow.

SUMMARY OF THE INVENTION

A process for improving the processing of thermoplastic polymers in fabrication equipment which comprises adding to the thermoplastic polymer from 0.01 to 1 part per hundred parts of thermoplastic polymer of a mixture comprising:

(a) a processing additive, said processing additive being a polymeric material with a molecular weight ranging from 500 to 100,000 and having on its molecule at least two monofunctional groups selected from the group consisting of hydroxy, alkoxy, epoxy, carboxy and amino groups, and (b) a processing adjuvant, said processing a being a molecule having at least two monofunctional groups or at least one multifunctional group wherein at least one functional group provides preferential adsorption over the processing additive for the fabrication surface and wherein at least one other functional group is capable of bonding with the processing additive, wherein (a) and (b) are present in a ratio of from 50:1 to 1:20.

DETAILED DESCRIPTION OF THE INVENTION

In accordance with the present invention there is provided a processing aid to be used in processing thermoplastic polymers through various fabrication equipment. The processing aid comprises a mixture of at least a processing additive and a processing adjuvant.

The Processing Additive

The processing additive is a polymeric material with a molecular weight ranging from 500 to 100,000, preferably from 1,000 to 20,000.

The processing additive must have on its molecule at least two monofunctional groups. The functional group, or groups, is selected from the group consisting of hydroxy, alkoxy, epoxy, carboxy and amino groups. Most preferably, all the monofunctional groups are hydroxy groups.

It is also preferred, although not critical, that during the processing of the thermoplastic polymers the processing additive be a liquid and have a viscosity lower than that of the molten thermoplastic polymer. Typically, a one melt index linear low density polyethylene at 280° C., for example has a viscosity of $4 \times 10^6$ cps at 10 second $^{-1}$ shear rate.

In general the following are representative materials that may be employed in the present invention as processing additives: polyether polyols, silicone polyether block copolymers, polyamines, polycarboxylic acids, polycarboxylic anhydrides, polycarboxylates, and epoxy resins.

In a preferred embodiment, the processing additive is a silicone containing material having the formula:

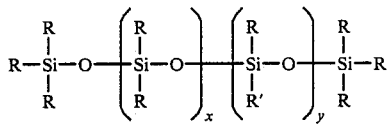

wherein R is an alkyl group containing from 1 to 12 carbon atoms preferably from 1 to 4 carbon atoms, R' is a monovalent organic group containing at least one alkylene oxide unit and an alkoxy, hydroxy, carboxy, epoxy or amino group; x has a value of at least 1 to 500, preferably 10 to 200; and y has a value of from 2 to 300, preferably 2 to 20.

Most preferably, R is methyl, R' is $C_3H_6(OC_2H_4)_aOH$, x is from 50 to 100, y is 4 to 6, and a is 5 to 10.

Also preferred are the polyether polyols used in the art. Illustrative of the useful polyether polyols are the polyhydroxyalkanes, the polyoxyalkylene polyols, or the like. Among the polyether polyols which can be employed are those selected from one or more of the following classes of compositions, alone or in admixture, known to those skilled in the art:

(a) alkylene oxide adducts of polyhydroxyalkanes;

(b) alkylene oxide adducts of nonreducing sugars and sugar derivatives;

(c) alkylene oxide adducts of phosphorus and polyphosphorus acids;

(d) alkylene oxide adducts of polyphenols;

(e) the polyether polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1-6, and 1-8 dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

A further class of polyether polyols which can be employed are the alkylene oxide adducts of the nonreducing sugars, wherein the alkylene oxides have from 2 to 4 carbon atoms. Among the nonreducing sugars and sugar derivatives contemplated are sucrose, alkyl glycosides such as methyl glucoside, ethyl glucoside, and the like, glycol glycosides such as ethylene glycol glucoside, propylene glycol glycoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyether polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation productions of phenol and formaldehyde, and novolac resins; condensation products of various phenolic compounds and acrolein; the simplest member of this class being 1,2,3-tris(hydroxyphenyl) propane, condensation products of various phenolic compounds and glyoxal, glutaraldehyde, and other dialdehydes, the simplest members of this class being 1,1,2,2-tetrakis (hydroxyphenol) ethane, and the like The alkylene oxide adducts of phosphorus and polyphosphorus acids are another useful class of polyols. Ethylene oxide, 1,2-epoxypropane, the epoxybutanes, 3-chloro 1,2-epoxypropane, and the like are preferred alkylene oxides. Phosphoric acid, phosphorous acid, the polyphosphoric acids such as tripolyphosphoric acid, the polymetaphosphoric acids, and the like are desirable for use in this connection.

Indeed, any material having an active hydrogen as determined by the Zerewitinoff test may be utilized as the polyether polyol. For example, amine terminated polyether polyols are known and may be utilized, if desired.

The most preferred polyols employed in this invention include the poly(oxypropylene) glycols, triols, and higher functionality polyols, and the like. Generally, the nominal functionality of such polyols will be in the range of about 3 to 4 or so. These polyols also include poly-(oxypropylene oxyethylene) polyols.

The Processing Adjuvant

The second component is a processing adjuvant. The processing adjuvant is characterized by having at least two monofunctional groups or at least one multifunctional group on its molecule wherein at least one functional group provides preferential adsorption over the processing additive for the fabrication surface and wherein at least one other functional group is capable of bonding with the processing additive. By bonding what is meant is attraction interactions between dissimilar molecules or functional groups, such as hydrogen bonds and acid-base interactions to name but a few.

In general the organo derivatives of the following materials are illustrative of useful processing adjuvants: carboxylates, phosphates, thiophosphates, phosphonates, sulfates, phosphoric acids, carboxylic acids, sulfites, phosphorous acids, sulfuric acids, carboxylic anhydrides, sulfonic acids, sulfonates, phosphonic acids, phosphites, thiophosphites and ammonia.

Preferably, the processing adjuvant is an organo derivative having at least one group represented by the formula:

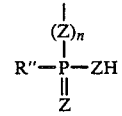

wherein Z is either an oxygen or sulfur atom, n is 0 or 1, and R″ is selected from the group consisting of R″, ZR‴, and ZH where R‴ is an alkyl, aryl, alkenyl or alkynyl group containing from 1 to 24 carbon atoms, preferably from 1 to 6 carbon atoms. The organo backbone to which the above group(s) is attached can either be linear, such as is the case with dodecane phosphonic acid, or cyclic, such as is the case with phytic acid.

Other, less preferred, processing adjuvants are organic derivatives of: a sulfonate, such as alkyl benzene disulfonate; a carboxylate, such as a carboxylic acid grafted on an polyalkylene glycol; an amine; or an oxime.

The processing additive and processing adjuvant are employed in a weight ratio of 50:1 to 1:20 respectively, preferably 5:1 to 1:5 and most preferably 2:1 to 1:2. It should be noted that less of the processing adjuvant will be required when the processing adjuvant exhibits very strong adsorption characteristics relative to the fabrication surface. Likewise, the equivalent weight of either the processing additive or the processing adjuvant will influence the amount required, in each case the higher the equivalent weight the more material will be needed.

The two component mixture should be used in an amount ranging from 0.01 to 1 part, per hundred parts of thermoplastic polymer. In special cases, such as in the preconditioning of a metal surface, concentrations up to 5 parts per hundred parts may be employed. Preferably, the mixture will be used in an amount ranging from 0.02 to 0.3 part per hundred parts of thermoplastic polymer.

In certain instances the benefit of the present invention will be obtained by adding a concentrate of the processing additive and the processing adjuvant in a thermoplastic with optional additives such as an antiblocking agent. Such concentrates will typically have from 1 to 30 parts, preferably from 1 to 10 parts, of the additive/adjuvant mixture per hundred parts of thermoplastic polymer. In addition, from 0 to 30 parts, preferably from 1 to 10 parts, of an antiblocking agent may also be employed.

Without wishing to be bound by the following description of the mechanism, it is believed that the superior performance of the processing aids of this invention is partly due to the creation of a particularly well defined liquid boundary layer between the metal surface and the molten polymer.

The boundary or slip layer between the metal surface and the flowing polymer melt may not need to be liquid in order to achieve the improvements in processing discussed above, but may in fact possibly be solid, visco elastic, elastico viscous or even plastic. The present state of understanding of the micro rheological properties of the slip layer is such that it is still difficult to reconcile all of the available experimental observations. However, it appears that whatever the nature of the metal/polymer interface, a strong adherence between the metal and the polymer, or between the metal and an interposed boundary layer is necessary. The prevention of polymer melts sticking to fabrication surfaces is a nearly universal requirement for processability. The design and control of the boundary layer is therefore an important area of research in polymer melt processing.

In pressure flow, such as it occurs in an extrusion die or in the gates and runners of an injection mold, the major velocity gradient occurs in this boundary layer, which shall be referred to as the "slip layer". As a consequence, the shear stress in the polymer melt adjacent to the "slip layer", is dramatically reduced and it is therefor now possible to increase flow rates substantially before instability phenomena such as melt fracture can occur. In analogy with the experience with high pressure lubricants, it is believed that the slip layer in itself must be strongly adherent to the metal surface, otherwise it will separate from the metal, i.e. it will no longer wet the metal surface and consequently no longer serve the function of a lubricating boundary layer.

The processing adjuvant component(s) of the processing aid is required in case the thermoplastic polymer contains additives having stronger adsorptivity to the metal than does the processing additive. In that case, the adjuvant will displace the interfering additive from the metal surface, and being itself readily wetted by the processing additive, will assure the stability of the slip layer.

In cases of composite flows, e.g. combinations of drag and pressure flows, such as they occur for example in a single screw extruder with an attached die, the effects of lubricating slip layers are more complex. The routine assumption of the polymer wetting both the barrel and the root of the screw now no longer holds and the results may be either beneficial or detrimental, depending on the situation. In the case of slip on the barrel while the polymer sticks to the screw, the power consumption will tend toward zero as will the output. In case of adhesion to the barrel and slip on the screw, the material will move in near plug flow and the power and output will both increase relative to the case where both the screw and barrel are wetted by the polymer melt. If there is a slip layer on both the screw and the barrel, the operation will be unstable and oscillations in power and output would be expected. Clearly, when differences in adhesion or slip layer effects of the barrel versus the screw can be controlled through temperatures and/or metal surfaces, a new level of process control can be achieved.

The formation of surfaces in the pressure flow of molding and extrusion through a die is known to occur by so called "fountain flow", i.e. the faster moving central stream folds over onto the walls and lies down onto the metal. It is expected that slip layers show beneficial surface effects in two ways, first by reducing the velocity gradient across the molten thermoplastic stream, hence reducing the folding with its associated possibilities of entrapping air inclusions and other irregularities in the advancing flow front; second by allowing the surface more opportunity to "heal", i.e. relax, because shear stresses at the polymer/slip layer interface at constant flow rates are much lower than in the absence of the slip layer.

In short, it is believed that the ability to control the nature of the slip layer defined in this manner is the reason for the superior performance which is achieved with the processing aids of the present invention.

To obtain direct evidence for a lubricating layer, a small Brabender extruder was fitted with a tape die in which one die face contained a removable metal insert. By extruding resin containing various additives over this face for 30 minutes, then removing the insert and examining it using X ray photoelectron spectroscopy (XPS), it was possible to monitor the concentrations of various atomic species at the surface of the die. The deposition of a silicon-containing processing aid layer at the die surface was clearly demonstrated by this technique. As the concentration of processing aid in the polymer melt increased, so did the concentration of silicon on the die surface.

As shown in Table 1, in the absence of adjuvant, as the concentration of zinc stearate in the thermoplastic melt was increased, the amount of silicon on the surface decreased. This shows that zinc stearate in the polymer melt adsorbs on the die surface and reduces the ability of the processing additive to establish a layer there. Adding Antiblock A (ground diatomaceous earth) to the system significantly reduced the concentration of zinc on the die surface and increased the concentration of silicon. In the presence of dodecanephosphonic acid, the zinc concentration on the die surface decreased and the silicon content increased to a level even higher than that permitted by the antiblock. Thus the phosphonic acid enhanced the adsorption and retention of the processing additive molecules on the die surface.

TABLE 1

| | (Chrome metal used) | | | |
| --- | --- | --- | --- | --- |
| | Atom % | | | |
| | Si | Zn | C=O | P |
| 0.25% Antiblock A<br>0.1% Silicone A<br>0.05% Zinc Stearate | 11.9 | 0.3 | 0.4 | 0 |
| 0.25% Antiblock A<br>0.1% Silicone A<br>0.1% Zinc Stearate | 7.8 | 1.2 | 0.7 | 0 |
| 0.1% Silicone A<br>0.1% Zinc Stearate | 3.7 | 1.6 | 3.8 | 0 |
| 0.25% Antiblock A<br>0.1% Zinc Stearate | 1.4 | 2.0 | 1.5 | 0 |
| 0.25% Antiblock A<br>0.1% Silicone A<br>0.1% Zinc Stearate<br>0.1% PA | 13.9 | 0.1 | 0 | 0.1 |
| 0.25% Antiblock A<br>0.1% Silicone A<br>0.1% Zinc Stearate<br>0.05% PJ | 14.6 | 0.2 | 0.5 | 0.4 |

In addition to the XPS method used, many other methods for determining the affinity of molecules to substrates may be used. Refer for example to *Physical Chemistry of Surface*, by A. W. Adamson, 4th Ed., Interscience, 1982.

Other additives which are commonly employed in the fabrication of thermoplastic polymers may be utilized, when warranted, in the present invention. Illustrative of such additives are the reinforcing and non reinforcing fillers, coupling agents, antiblocking agents, dispersion aids, plasticizers, light stabilizers and antioxidants. In particular, the use of antiblocking agents is desirable when practicing the present invention. These are particulate mineral fillers of natural or synthetic origin such as diatomaceous earth, which are added in small amounts to film formulations in order to reduce film to film adhesion ("blocking") and thereby facilitate the manual opening of bags, the unwinding of film from rolls, etc.

The Thermoplastic Polymer

The polymers generally useful in the present invention are the thermoplastics, which for the purpose of this invention include the crosslinkable or vulcanizable elastomers, as long as they can be fabricated by standard thermoplastic melt processing techniques such as extrusion, milling, calendering, injection molding and/or melt spinning into fibers. One important polymer group is the addition polymers including the polyolefins, fluorocarbon polymers, vinyls, styrenics, acrylics and methacrylics, diene elastomers, thermoplastic elastomers and polyacetals. Another major group comprises the condensation polymers including the polyesters, polyamids, polycarbonates, polysulfones and polyurethanes. Still another polymer group is the thermoplastic cellulosic ethers and esters.

Examples of polyolefins are the homopolymers, copolymers and terpolymers of ethylene, propylene, butene-1,4-methyl pentene-1, isobutylene and co and terpolymers thereof, including co and terpolymers with dienes and with polar monomers. Examples of fluorocarbon polymers are polytetrafluoroethylene and polytrifluorochloroethylene. Examples of vinyl polymers are polyvinyl chloride, polyvinyl acetate, polyvinyl alcohol, polyacrylonitrile and the co- and terpolymers thereof, including co- and terpolymers with other monomers such as maleic anhydride and maleic acid. Examples of styrenic polymers are polystyrene, poly α-methyl styrene, the co- and terpolymers thereof and with other monomers such as acrylonitrile, methyl methacrylate and the the like and including rubber modified impact resistant polymer blends. Examples of acrylic and methacrylic polymers are polyacrylic acid and polymethacrylic acid, their copolymers, esters and salts. Examples of polydienes are polybutadiene, polyisoprene, polychloroprene, polycyanoprene and copolymers thereof, specifically the co and terpolymers with styrene and acrylonitrile. Examples of polyacetals are polymethylene oxide, polytrioxane and copolymers thereof.

Examples of polyesters are polyethylene terephthalate, polybutylene terephthalate, polyethylene isophthalate and their copolymers. Examples of polyamids are poly-ε-caprolactam, polyhexamethylene adipamide and polyhexamethylene sebacamide. An example of a polycarbonate is the reaction product of a bisphenol A with diphenyl carbonate and an example of a polysulfone is the reaction product of an alkaline salt of bisphenol A with p,p'-dichlorophenyl sulfone. Examples of polyurethanes are the fiber-forming polymer made from hexamethylene diisocyanate and tetramethylene glycol and the elastomeric polymer made from diphenylmethane p,p'-diisocyanate, adipic acid and butanediol 1,4.

Examples of thermoplastic cellulosics are ethyl cellulose, cellulose acetate, cellulose butyrate, hydroxy propyl cellulose and the like.

Most preferable are the olefin polymers, copolymers, terpolymers and the blends thereof. Examples are interpolymers of olefin monomers such as ethylene, propylene, butene-1, isobutylene, pentene 1, hexene 1, 4 methyl pentene 1, octene 1, nonene 1 and decene 1; interpolymers with dienes such as ethylidene norbornene, cyclopentadiene and hexadiene; interpolymers with polar monomers such as: vinyl acetate; vinyl alcohol; acrylic acid and methacrylic acid, their esters and salts; acrylamide and methacrylamide and N alkyl versions thereof; carbon monoxide and the like. Examples of most preferable polyolefin homo and copolymer blends are the blends of one or more of LDPE (low density, high pressure polyethylene), HDPE (high density polyethylene), LLDPE (linear low density polyethylene), PP (isotactic polypropylene), EPR (ethylene/propylene rubber), EPDM (ethylene/ propylene/diene monomer), EVA (ethylene/vinyl acetate), EEA (ethylene/ethyl acrylate) and EAA (ethylene/acrylic acid).

Particularly preferred ethylene polymers for purposes of this invention are low pressure, substantially linear ethylene homopolymers and ethylene-$C_3$ to $C_8$ alpha olefin interpolymers having a density of about 0.850 to about 0.970, preferably about 0.875 to about 0.930. These interpolymers can be prepared by reacting a mixture containing about 50 to 99.9 mole percent, preferably about 75 to 96 mole percent ethylene and from about 0.1 to 50 mole percent and preferably about 4 to about 25 mole percent of one or more $C_3$ to $C_8$ alpha olefins such as propylene, butene-1, pentene 1, 4-methyl-pentene-1, hexene 1, heptene-1, octene 1 and the like, using a magnesium chloride/titanium chloride catalyst and employing low pressures on the order of about 15 to 300 psi as disclosed in U.S. Pat. No. 4,302,565, granted Nov. 24, 1981.

These thermoplastic polymers are available in various types and grades and may be formulated with other ingredients into powders, pellets, flakes, granules, liquid reins or solutions.

These polymers are transformed into plastic articles by a variety of processes. Generically, this involves a melt, either partial or complete, of the polymer by heat and compression of the softened polymer into the desired shape. Some of the more conventional processes include calendering, casting, coating, fiber spinning, extruding, laminating, blow molding, compression molding, injection molding, jet molding, post forming, shell molding, sheet forming, slush molding and vacuum forming. For an overview of these various processing techniques see *Concise Guide to Plastics, Sec. Ed*, Simonds and Church, (Reinhold Publishing Corp, N.Y. 1963). The present invention finds particular utility in extrusion and molding operations, and most preferably in film extrusion and injection molding.

The fabrication equipment these processes run in is made of a variety of materials. By far the majority are constructed of metal dies, screws and tubes. Representative metals commonly employed are steel, including stainless and chrome plated; bronze; sintered bronze; brass; and nickel. In addition, various non-metallic fabrication surfaces may be encountered such as glass, graphite, and the like.

The formation of a boundary layer of the processing additive between the molten thermoplastic polymer and the fabrication surface provides a number of advantages in polymer melt fabrication. The presence of a processing adjuvant further enhances and stabilizes this layer. Among the process advantages are higher production rates before melt fracture; reduced power consumption; reduced torque; improved production efficiency; reduced die pressure; improved surface and product quality in molding and extrusion.

The present invention therefore provides a superior class of processing aids for thermoplastic polymers, which are effective at low or even at trace level concentrations; tailored to overcome interference from other conventional thermoplastic additives of both kinds, i.e. both product additives and process aids; capable of alleviating a number of troublesome processing problems in the melt fabrication of thermoplastic parts such as melt fracture, sticking, plate-out, fouling of extruder screws, surface defects, mold fill-out difficulties due to high injection pressure needs and extrusion difficulties due to high power requirements.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

DEFINITIONS

Processing Additives

Silicone A (CH$_3$)$_3$SiO—((CH$_3$)$_2$SiO)$_{72}$((CH$_3$)SiO$_{5.5}$Si(CH$_3$)$_3$CH$_2$CH$_2$CH$_2$(OCH$_2$CH$_2$)$_{6.7}$OH

Silicone B

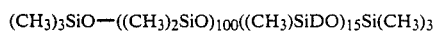

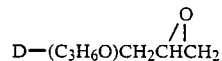

Acrylic A

A glycerine started polyether polyol having a molecular weight of approximately 6000 to which 10% acrylic acid has been grafted by free radical polymerization.

Amine C

A secondary amine made by reacting a 6000 molecular weight triol having a hydroxyl number of 28 with a propylene oxide content of 83% based on the total alkylene oxide content and an ethylene oxide content of 17%, with a primary amine.

Fluoroelastomer A

A commercial master batch made with 2% fluoroelastomer in polyethylene sold by A. Schulman as AMF 702.

Polyether B

A butanol started polyalkylene oxide copolymer having 75% ethylene oxide, 25% propylene oxide random copolymer with a viscosity of about 38000 Saybolt universal second.

Polyol A

A glycerine started polyoxypropylene polyol having a hydroxy number of 8 with a viscosity 25° C. of 492 cSt.

Polyol B

Sorbitol started condensate with polyoxypropylene and tipped with polyoxyethylene (16%) having a hydroxyl number of 28 with an average molecular weight of 6000.

Concentrate A

A blend containing 5% by weight of Silicone A, 5% by wt. of Antiblock A in 90% by weight of a 2 melt index linear low density polyethylene.

Concentrate B

A blend containing 5% by weight of Silicone A, 5% by weight of PB, 10% by weight of Antiblock A in 80% by weight of a 2 melt index linear low density polyethylene.

Processing Adjuvants

Sulfonate A

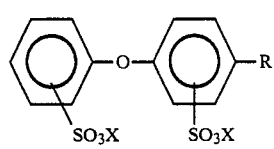

R = Tetrapropylene
X = a cation

A sulfonate sold by Dow as "Dowfax 2EP" as having an average molecular of 576 and viscosity at 25° C. of 145 cPs.

Polyether A

A phosphated polyalkylene oxide block copolymer prepared by reacting polyphosphoric acid with a polyether diol sold by BASF Wyandotte Corp. as "Pluronic L62" in a 1.3:1 mole ratio.

PA

Dodecane phosphonic acid

PB

Poly(oxy-1,2-ethanediyl), alpha-(nonyl phenyl)-omega-hydroxy-phosphate.

PC

An acid phosphate derivative prepared by reacting phosphoric acid with a butanol started polyoxypropylene with viscosity about 385 Saybolt universal seconds in a 1.3:1 mole ratio.

PD

The reaction product of Polyol A and polyphospho in a 1:1.3 mole ratio.

PE

An acid phosphate derivative prepared by reacting phosphoric acid with a nonylphenyl polyether having an average 13 units of ethylene oxide in a 1:3:1 mole ratio.

PF

Zinc dithiophosphate sold by Lubrizol Corp.

Oxime A

A mineral reagent comprising a mixture of substituted oximes sold by Henkel as "LIX 64N".

PG

Phosphite antioxidant sold by Witco as "Mark 5082".

PH

Phosphite antioxidant sold by Witco as "Mark 1178".

PI

Phosphite antioxidant sold by Witco as "Mark 11788".

Amine B

An ethanolated alkylguanidine amine complex sold by American Cynamid Co. as "AEROSOL C61".

Carboxylate A

A polyacrylic acid sold by B. F. Goodrich as "Carbopol 934".

PJ

A polyether acid phosphate sold by Cyclo Cor. "Cyclophos PV4".

PK

A 50% aqueous solution of phytic acid.

PL mono magnesium mono potassium phytate.

Thermoplastic Polymers

Polyolefin A

A one melt-index linear low density polyethylene sold by Union Carbide as "GRSN 7047".

Polyolefin B

A brand of high density polyethylene sold by Phillips Corp. as Marlex 5502:

Polyolefin C

A linear low density polyethylene sold by Union Carbide as "Tuflin HS7068".

Polyolefin D

A polypropylene sold by Hercules Corp. as "Pro-Fax 6801".

Polycarbonate

A bisphenol A polycarbonate sold by General Electric as "Lexan G 1382".

Polysulfone System

A polysulfone alloy containing polysulfone, polyethyleneterephthalate and fiberglass sold by Amoco as "Mindel B322".

Misc. Additives

Antiblock A

A diatomaceous silica sold by Manville Corp. as "Super Floss".
ZnST; zinc stearate.
Melt Index: ASTM D-1238.
Unit Power: (Torque×RPM)÷Output

GENERAL PROCEDURE

The extrusion studies were done using a laboratory Brabender single screw extruder (type EX-250 SN: 378) equipped with a 3/4 inch chrome plated screw (with 25 L/D and compression ratio 3:1) and a 416 stainless steel and nitrite hardened barrel. The extruder was heated with 3-zone electrical heaters.

The extruder had a steel tape die. The upper die land was fitted with an insert of a specific metal which could be easily changed. The exit opening of the die had a dimension of 0.6×0.049 inch which was defined by means of shims.

Most of the extrusion experiments were done at 80 RPM with approximately 6 pounds per hour output at about 1200 psi pressure. At this output the shear rate was calculated to be about 250 sec $^{-1}$ Brabender Plasticorder equipment allowed recording of the torque.

Unless otherwise specified, the experiments were run with Polyolefin A, 0.25 wt. %, based on the weight of Polyolefin A, of Antiblock A and 0.1 wt. based on the weight of Polyolefin A, of ZnST (some of which is contained Polyolefin A) through a mild steel metal insert and at 200° C. for about 30 minutes. It should be noted that the results were seen to vary between the different polyolefin resin lots, however within any given lot the results were consistent. Polyolefin A containing 5% Antiblock A was used to clean the extruder between runs for a time interval sufficient to recover full melt fracture. All additives were mixed with the resin prior to processing using a high speed Henschel mixer for about 5 minutes at 1800 RPM. The evaluation of the tape extrudate was done by visual observation. Thus, melt fracture is reported as the percentage, based on visual observation, of both surfaces affected by melt fracture roughening as measured 5, 15 and 30 minutes after the start of extrusion.

EXAMPLES

EXAMPLE 1

Table 2 shows the effect of PK as a processing adjuvant with and without a silicone processing additive in melt fracture reduction when the General Procedure is followed.

TABLE 2

| | % Melt Fracture | | |
|---|---|---|---|
| | 5 minutes | 15 minutes | 30 minutes |
| No additive | 100 | 100 | 100 |
| 0.1% PK | 100 | 100 | 100 |
| 0.1% Silicone A | 95 | 70 | 35 |
| 0.1% Silicone A with 0.1% PK | 5 | 0 | 0 |
| 0.2% Silicone A | 100 | 50 | 10 |

EXAMPLE 2

Table 3 shows the effect of concentration range of a silicone processing additive and an adjuvant when the General Procedure is followed.

TABLE 3

| | % Melt Fracture | | |
|---|---|---|---|
| | 5 minutes | 15 minutes | 30 minutes |
| 0.1% Silicone A | 95 | 65 | 45 |
| 0.1% Silicone A | 95 | 70 | 35 |
| 0.1% PK | 100 | 100 | 95 |
| 0.1% Antiblock A | | | |
| 0.1% Silicone A 0.1% PK | 5 | 0 | 0 |
| 0.05% Silicone A 0.05% PK | 80 | 40 | 15 |
| 0.1% Silicone A 0.1% PL | 10 | 0 | 0 |
| No Additives | 100 | 100 | 95 |
| 2% Concentrate A | 95 | 45 | 45 |
| 2% Concentrate A 0.005% PL | 45 | 5 | 0 |
| 2% Concentrate A 0.01% PL | 45 | 0 | 0 |
| 2% Concentrate A 0.02% PL | 10 | 0 | 0 |
| 2% Concentrate A 0.04% PL | 5 | 0 | 0 |
| 0.5% Concentrate A 0.1% PL | 15 | 5 | 5 |
| 0.04% PL, 0.1% Antiblock A | 95 | 95 | 30 |
| 0.04% PL 0.1% Antiblock A | | | |
| 2% Concentrate A 0.04% PL 0.1% Antiblock A | 25 | 0 | 0 |
| 1% Concentrate A 0.4% PL 0.1% Antiblock A | 35 | 10 | 5 |
| 0.5% Concentrate A | 45 | 10 | 10 |

EXAMPLE 3

Table 4 shows the effect of many other processing adjuvant structures in enhancing the silicone processing additive s ability to eliminate melt fracture when the General Procedure is followed.

TABLE 4

| | | % Melt Fracture | | |
|---|---|---|---|---|
| | | 5 minutes | 15 minutes | 30 minutes |
| 1 | No processing aid | 100 | 100 | 100 |
| 2 | 0.1% Silicone A | 95 | 25 | 20 |
| 3 | 0.1% Silicone A 0.1% Polyether A | 100 | 20 | 0 |
| 4 | 0.1% Silicone A | 100 | 80 | 55 |
| 5 | 0.1% Silicone A 0.1% dodecyl acid phosphate | 55 | 0 | 0 |
| 6 | 0.1% Silicone A 0.1% PF | 90 | 0 | 0 |
| 7 | 0.1% Silicone A 0.1% PD | 95 | 15 | 0 |
| 8 | 0.1% Silicone A 0.1% stearyl phosphate | 90 | 45 | 45 |
| 9 | 0.1% Silicone A 0.1% PE | 100 | 20 | 15 |
| 10 | 0.1% Silicone A 0.1% phosphoric acid | 100 | 75 | 60 |
| 11 | 0.1% Silicone A | 100 | 65 | 30 |
| 12 | 0.1% Silicone A 0.1% hydroxymethyl-phosphoric acid | 25 | 10 | 10 |
| 13 | 0.1% Silicone A 0.1% methyl succinic anhydride | 70 | 40 | 20 |
| 14 | 0.1% Silicone A 0.1% tetraethylhexyl silicate | 70 | 30 | 20 |
| 15 | 0.1% Silicone A 0.1% Amine B | 95 | 70 | 50 |
| 16 | 0.1% Silicone A 0.1% Oxime A | 45 | 25 | 15 |
| 17 | 0.1% Silicone A 0.1% PA | 75 | 5 | 0 |
| 18 | 0.1% Silicone A 0.1% citric acid | 65 | 25 | 10 |
| 19 | 0.1% Silicone A | 90 | 70 | 50 |
| 20 | 0.1% Silicone A 0.1% PB | 70 | 20 | 0 |
| 21 | 0.1% Silicone A 0.1% phenyl phosphonic acid | 65 | 25 | 0 |

The effectiveness of processing additive Silicone A in melt fracture elimination varies from different source of resins, as indicated in 2, 11, 19 above. The performance of the combination of adjuvant and additive is compared to Silicone A alone in three groups above using the same resin within each group. It is seen that within each group, the effectiveness of the combination is significantly better than using processing additive Silicone A alone.

EXAMPLE 4

The following runs followed the General Procedure and explored the use of other processing additives which include polyether, polyols, polyether amines, carboxylic acid functional polyol, and epoxy functional silicone.

TABLE 5

| | % Melt Fracture | | |
|---|---|---|---|
| | 5 M | 15 M | 30 M |
| No additive | 100 | 100 | 100 |
| 0.1% Silicone A | 70 | 30 | 20 |

TABLE 5-continued

| | % Melt Fracture | | |
|---|---|---|---|
| | 5 M | 15 M | 30 M |
| 0.1% Polyol B | 95 | 75 | 30 |
| 0.1% Polyol A | 70 | 55 | 55 |
| 0.1% Silicone A 0.1% PB | 50 | 5 | 0 |
| No additive | 100 | 85 | 85 |
| 0.1% Polyol B | 80 | 75 | 70 |
| 0.1% PL | 85 | 85 | 75 |
| 0.1% Polyol B 0.1% PL | 70 | 15 | 20 |
| 0.1% PB | 95 | 85 | 75 |
| 0.1% Polyol B 0.1% PB | 65 | 55 | 30 |
| 0.1% PA | 95 | 85 | 70 |
| 0.1% Polyol B 0.1% PA | 15 | 10 | 5 |
| The following runs contain 0.05% ZnST: | | | |
| 0.1% Amine C | 95 | 70 | 60 |
| 0.1% PA | 100 | 85 | 80 |
| 0.1% Amine C 0.1% PA | 40 | 10 | 5 |
| 0.1% Silicone B | 80 | 50 | 40 |
| 0.1% Silicone B 0.1% PA | 95 | 40 | 5 |
| 0.1% Acrylic A | 100 | 95 | 45 |
| 0.1% Acrylic A 0.1% PA | 20 | 0 | 0 |
| 0.1% Acrylic A 0.1% Silicone A | 25 | 0 | 0 |

The last two runs show that the acrylic grafted polyol behaves like both processing additive and adjuvant. It enhances both additive and adjuvant.

EXAMPLE 5

Brabender extrusion study at 3 different screw speeds was investigated using Polyolefin A and 0.05 wt. % ZnST (no antiblock). Results are listed in Table 6.

TABLE 6

| | RPM | Torque (gm) | Output (g/m) | Units Power |
|---|---|---|---|---|
| Neat | 80 | 3600 | 32.9 | 8754 |
| | 120 | 4450 | 53.6 | 9963 |
| | 147 | 4950 | 69.4 | 9425 |
| 2% Concentrate A | 80 | 3500 | 37.9 | 7387 |
| | 120 | 4200 | 55.3 | 9113 |
| | 147 | 4600 | 65.2 | 10371 |
| 2% Concentrate A + 0.1% PA | 80 | 2800 | 35.2 | 6364 |
| | 120 | 3100 | 50.3 | 7396 |
| | 148 | 3300 | 61.6 | 7929 |

EXAMPLE 6

TABLE 7

| | RPM | Torque (gm) | Output (g/m) | Unit Power |
|---|---|---|---|---|
| Neat | 40 | 4350 | 18.9 | 9206 |
| | 80 | 5400 | 40.6 | 10640 |
| 0.1% Silicone A | 40 | 1200 | 10.5 | 4571 |
| | 80 | 1600 | 14.8 | 8649 |
| 0.1% Silicone A 0.1% PA | 40 | 1500 | 12.2 | 4918 |
| | 80 | 1950 | 24.6 | 6341 |

EXAMPLE 7

Table 8 shows the results obtained when 60 wt. % aluminum trihydrate (pretreated with 0.02 wt. % of a silane coupling agent) is added to 20 wt. % Polyolefin B and 20 wt. % Polyolefin C (no ZnST or antiblock).

TABLE 8

| | RPM | Torque (gm) | Output (g/m) | Unit Power |
|---|---|---|---|---|
| Neat | 20 | 6000 | 16.3 | 7362 |
| | 40 | 7000 | 33.4 | 8383 |
| | 60 | 7250 | 50.1 | 8683 |
| 0.1% Silicone A | 20 | 4000 | 16 | 5000 |
| | 40 | 5250 | 34.1 | 6158 |
| | 60 | 5500 | 50.5 | 6535 |
| 0.1% Silicone A 0.1% PA | 20 | 1750 | 11.9 | 2941 |
| | 40 | 3000 | 27.7 | 4332 |
| | 60 | 3500 | 43.2 | 4861 |

EXAMPLE 8

Table 9 lists the result of Polycarbonate extruded without ZnST or antiblock.

TABLE 9

| | °C. | RPM | Torque (gm) | Output (g/m) | Unit Power |
|---|---|---|---|---|---|
| Neat | 280 | 20 | 6000 | 21 | 5714 |
| | 280 | 40 | 6500 | 36.6 | 7104 |
| 0.1% Silicone A | 280 | 20 | 250 | 10.3 | 485 |
| | 280 | 40 | 450 | 20.9 | 861 |
| | 280 | 60 | 650 | 30.6 | 1275 |
| 0.1% Silicone A 0.1% PA | 280 | 20 | 250 | 17.3 | 289 |
| | 280 | 40 | 410 | 30.4 | 540 |
| | 280 | 60 | 950 | 46.5 | 1226 |
| 0.1% Silicone A | 250 | 20 | 800 | 14 | 1143 |
| 0.1% PA | 250 | 40 | 1000 | 25.1 | 1594 |
| | 250 | 60 | 1600 | 37.9 | 2533 |
| Neat | 250 | 20 | not processible | | |

EXAMPLE 9

Table 10 lists the results of processing Polyolefin D where only 0.05 wt. % ZnST and 0.25 wt% Antiblock A is employed and a processing temperature at 225° C. in the second and third zones with a first zone temperature at 200° C.

TABLE 10

| | RPM | Torque (gm) | Output (g/m) | Unit Power |
|---|---|---|---|---|
| Neat | 80 | 2150 | 34 | 5059 |
| | 120 | 2600 | 48.5 | 6433 |
| | 150 | 2700 | 59 | 6864 |
| 0.1% Silicone A | 80 | 2100 | 35 | 4800 |
| | 120 | 2400 | 49.5 | 5818 |
| | 150 | 2600 | 59 | 6610 |
| 0.1% Silicone A 0.1% PA | 80 | 1800 | 34 | 4235 |
| | 120 | 2200 | 48.2 | 5477 |
| | 150 | 2500 | 57 | 6579 |

EXAMPLE 10

This example is similar to Example 7 except that a 2 inch diameter 24/1 L/D extruder by Midland Ross Hartic was used. The screw was a two stage screw having a 3.2 turn feed section with a 2.5 pitch, a 6 turn compression section with a 2.0 pitch, a 4 turn metering section with a 2.0 pitch a short decompression section, a second 3.0 turn feed section, a second 1.0 turn compression section and a 4.0 turn metering section, all the second sections having a 2.5 pitch. The compression ratio in the first section was 4.3, in the second section 2.3. The channel depth in both feed sections were 0.400 inches, the channel depth in the first metering section was 0.092 inches, in the second metering section was 0.170 inches.

The results are listed in Table 11.

It is seen that the power usage for the same resin throughout is greatly reduced in the case of Silicone A plus adjuvant PA as compared to both the neat polymer and the Silicone A used by itself.

TABLE 11

| (205–210° C.) | RPM | Motor Amperage | Output (lb/hr) | Motor Amp/ Output |
|---|---|---|---|---|
| | 25 | 43 | 29.5 | 1.46 |
| Neat | 50 | 52 | 60.5 | 0.86 |
| | 75 | 55.6 | 84 | 0.66 |
| 0.1% Silicone A | 25 | 43 | 32.3 | 1.33 |
| | 50 | 50 | 59.7 | 0.84 |
| | 75 | 53.6 | 84 | 0.64 |
| 0.1% Silicone A | 25 | 26 | 25.7 | 1.01 |
| 0.1% PA | 50 | 36 | 52.1 | 0.69 |
| | 75 | 44 | 82.2 | 0.54 |

EXAMPLE 11

An Arburg 1.2 oz. injection molder was used to injection mold a Polysulfone System without ZnST or antiblock with the following conditions:

| Temperature setting | Heater (Nozzle) | 520° F. |
|---|---|---|
| | Heater 2 | 530° F. |
| | Heater 3 | 540° F. |
| | Heater 4 | 540° F. |
| Screw RPM - 410 | | |
| Cycle Time | Delayed Injection | 1.0 sec. |
| | Injection | 4.0 sec. |
| | Holding Pressure | 13.0 sec. |
| | Cooling | 25 sec. |
| | Die Open | 2.5 sec. |
| Holding Pressure | 350 psi | |

Table 12 shows the results.

TABLE 12

| | Mold-Part Weight | | |
|---|---|---|---|
| Injection Pressure psi | Neat | 0.1% Silicone A | 0.1% Silicone A + 0.1% PA |
| 500 | 16.11 | 16.18 | 16.38 |
| 425 | 13.96* | 15.36* | 15.91 |
| 350 | — | — | 15.82 |
| 325 | — | — | 15.77 |
| 300 | — | — | 14.77* |

*Mold not completely filled.

This example illustrates that addition of minute amounts of Silicone A plus PA enables injection molding of a difficult-to-mold engineering compound at much lower injection pressures than is possible with the control compound without the adjuvant.

EXAMPLE 12

The following experiments show the beneficial effect on melt fracture elimination when the General Procedure is followed except that a chrome plated die insert was used.

TABLE 13

| | % Melt Fracture | | |
|---|---|---|---|
| | 5 M | 15 M | 30 M |
| No additive | 100 | 100 | 100 |
| 0.1% PA | 100 | 100 | 100 |
| 0.1% PD | 100 | 100 | 100 |
| 0.1% Silicone A | 95 | 35 | 25 |
| 0.1% Silicone A 0.1% PA | 10 | 0 | 0 |
| 0.1% Silicone A 0.1% PD | 95 | 25 | 10 |

TABLE 13-continued

| | % Melt Fracture | | |
|---|---|---|---|
| | 5 M | 15 M | 30 M |
| 0.1% Silicone A 0.1% PC | 100 | 60 | 20 |
| 0.1% Silicone A 0.1% Polyether A | 100 | 20 | 0 |
| 0.1% Silicone A 0.% dodecen-yl succinic anhydride | 100 | 55 | 20 |
| 0.1% Silicone A 0.1% decanoic acid (Mono functional) | 100 | 50 | 45 |

EXAMPLE 13

Following Example 12 except that only 0.05 wt % ZnSt was used, the following results were generated:

TABLE 14

| | % Melt Fracture | | |
|---|---|---|---|
| | 5 M | 15 M | 30 M |
| 0.1% Silicone A | 100 | 95 | 80 |
| 0.1% Silicone A 0.1% PB | 90 | 30 | 0 |
| 0.1% Silicone A 0.1% tridecyl acid phosphate | 40 | 5 | 0 |
| 2% Concentrate B 0.1% dodecen-yl succinic anhydride | 75 | 15 | 0 |

EXAMPLE 14

The following experiments use processing additive Silicone A which is from a preprocessed concentrate:

TABLE 15

| | % Melt Fracture | | |
|---|---|---|---|
| | 5 M | 15 M | 30 M |
| No additive | 100 | 100 | 100 |
| 2% Concentrate A | 95 | 45 | 45 |
| 4% Concentrate A | 45 | 35 | 35 |
| 2% Concentrate A 0.1% dodecen-yl succinic anhydride | 30 | 5 | 0 |
| 2% Concentrate A 0.1% Sulfonate A | 45 | 15 | 5 |
| 2% Concentrate A 0.1% phenyl phosphonic acid | 80 | 50 | 15 |

EXAMPLE 15

Following the General Procedure, it is shown that the fluoroelastomer processing additive is also enhanced by a processing adjuvant, although the effect is less noticeable.

TABLE 16

| | % Melt Fracture | | |
|---|---|---|---|
| | 5 M | 15 M | 30 M |
| 1.25% Fluoroelastomer A | 95 | 55 | 5 |
| 1.25% Fluoroelastomer A 0.1% PD | 80 | 35 | 0 |
| 2.5% Fluoroelastomer A | 95 | 20 | 5 |
| 2.5% Fluoroelastomer A 0.1% PD | 30 | 15 | 5 |

EXAMPLE 17

These runs are exploratory studies which examine the output of extrusion at 80 RPM with Polyolefin A in the presence of a 2% Concentrate B and different adjuvants:

TABLE 18

|  | Torque (g-m) | Wt. (g/Min) |
|---|---|---|
| Neat | 2100 | 22.6 |
| Neat | 2350 | 26.7 |
| 0.1% PA | 2100 | 28.7 |
| 0.1% PA | 2500 | 29.2 |
| 0.1% phenyl phosphonic acid | 2600 | 28 |
| 0.1% Carboxylate A | 2250 | 24 |
| 0.1% Diphenyl phosphinic acid | 2100 | 22.9 |
| 0.1% dihexadecyl phosphate | 1900 | 24.2 |
| 0.1% phenyl phosphinic acid | 2000 | 23.9 |
| 0.1% dodeceny acid phosphate | 2250 | 29.5 |
| 0.1% PL | 2500 | 29.2 |
| 0.1% PB | 2100 | 24.9 |
| 0.1% PD | 2000 | 20.4 |
| 0.1% sodium tetrametaphosphate | 2100 | 21.5 |
| 0.1% dodeceny succinic anhydride | 2000 | 18.9 |
| 0.1% stearyl phosphate | 2200 | 26.9 |
| 0.1% dodecyl oxybenzoic acid | 1959 | 19.3 |

EXAMPLE 18

The following runs explore the effect of non acidic phosphite ester antioxidants which may have small effect due to hydrolysis on Polyolefin A without ZnST or antiblock.

TABLE 19

|  | % Melt Fracture | | |
|---|---|---|---|
|  | 5 M | 15 M | 30 M |
| 2% Concentrate A 0.1% PG | 85 | 70 | 55 |
| 2% Concentrate A 0.1% PG/ 10% Water | 95 | 80 | 75 |
| 2% Concentrate A 0.1% PH | 100 | 80 | 60 |
| 2% Concentrate A 0.1% PH/ 10% Water | 95 | 65 | 55 |
| 2% Concentrate A 0.1% PI | 85 | 60 | 30 |
| 2% Concentrate A 0.1% PI/ 10% Water | 90 | 65 | 55 |

We claim:

1. A process for improving the processing of thermoplastic polymers in fabrication equipment which comprises adding to the thermoplastic polymer from 0.01 to 1 part, per hundred parts of thermo polymer, of a mixture comprising:
   (a) a processing additive, said processing additive being a polymeric material with a molecular weight ranging from 500 to 100,000, and having on its molecule at least two monofunctional groups selected from the group consisting of hydroxy, alkoxy, epoxy carboxy and amino groups, and
   (b) a processing adjuvant, said processing adjuvant being a molecule having at least two monofunctional groups or at least one multifunctional group wherein at least one functional group provides preferential adsorption over the processing additive for the fabrication surface and wherein at least one other functional group is capable of bonding with the processing additive, wherein (a) and (b) are present in a ratio of from 50:1 to 1:20.

2. The process of claim 1 wherein from 0.02 to 0.2 part, per hundred parts of thermoplastic polymer, of the mixture is added.

3. The process of claim 1 wherein the processing additive has a molecular weight ranging from 1,000 to 20,000.

4. The process of claim 1 wherein the processing additive is selected from the group consisting of polyether polyols, silicone polyether block copolymers, polyamines, polycarboxylic acids, polycarboxylic anhydrides and epoxy resins.

5. The process of claim 1 wherein the processing adjuvant is selected from the group consisting of organo derivatives of carboxylates, phosphates, thiophosphates, phosphonates, sulfates, phosphonic acids, carboxylic acids, sulfites, phosphorous acids, phosphoric acids, sulfuric acids, carboxylic anhydrides, sulfonic acids, sulfonates, phosphites, thiophosphites and ammonia.

6. The process of claim 1 wherein the processing additive and the processing adjuvant are employed in a weight ration of 2:1 to 1:2.

7. The process of claim 1 wherein the processing additive is a silicone polyether block copolymer and the processing adjuvant is an organoderivative containing a phosphorus atom.

8. The process of claim 1 wherein the processing additive is a polyether polyol and the processing adjuvant is an organoderivative containing a phosphorus atom.

9. The process of claim 1 wherein the thermoplastic polymer is a polyolefin.

10. A process for improving the processing of thermoplastic polymers in fabrication equipment which, comprises adding to the thermoplastic polymer from 0.01 to 1 part, per hundred parts of thermoplastic polymer, of a mixture comprising:
    (a) a fluoroelastomer, and
    (b) an organo derivative containing a phosphorus atom. wherein (a) and (b) are present in a ratio of from 50:1 to 1:20.

11. A process for improving the processing of thermoplastic polymers in fabrication equipment which comprises adding to the thermoplastic polymer from 0.01 to 1 part, per hundred parts of thermoplastic polymer, of a mixture comprising:
    (a) a silicone containing material having the formula:

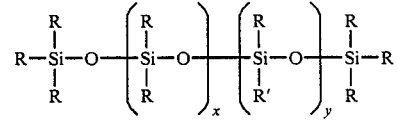

wherein R is an alkyl group containing from 1 to 12 carbon atoms, R is a monovalent organic group containing at least one alkylene oxide unit and an alkoxy, hydroxy, epoxy, carboxy or amino group; x has a value of at least 1 to 500, and y has a value of from 2 to 300, and
    (b) an organo derivative having at least one group having the formula:

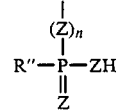

wherein Z is either an oxygen or sulfur atom, n is 0 or 1, and R" is selected from the group consisting of R''', ZR''', and ZH where R is an alkyl, aryl, alkenyl or alkynyl group containing from 1 to 24 carbon atoms, wherein (a) and (b) are present in a ratio of from 50:1 to 1:20.

12. The process of claim 11 wherein from 0.02 to 0.2 part, per hundred parts of thermoplastic polymer, of the mixture is added.

13. The process of claim 11 wherein the silicone containing material has a molecular weight ranging from 1,000 to 20,000.

14. The process of claim 11 wherein R is an alkyl group containing from 1 to 4 carbon atoms.

15. The process of claim 11 wherein x has a value of 10 to 200.

16. The process of claim 11 wherein y has a value of 2 to 20.

17. The process of claim 11 wherein R is methyl, R' is $C_3H_6(OC_2H_4)_aOH$, x is 50 to 100, y is 4 to 6, and a is 5 to 10.

18. The process of claim 11 wherein (b) is dodecane phosphonic acid.

19. The process of claim 11 wherein (b) is zinc dithiophosphate.

20. The process of claim 11 wherein (b) is an acid phytate salt.

21. The process of claim 11 wherein (b) is phytic acid.

22. The process of claim 11 wherein (a) and (b) are present in a ratio of 2:1 to 1:2.

23. The process of claim 11 wherein the thermoplastic polymer is a polyolefin.

24. The process of claim 23 wherein the polyolefin is a polyethylene.

25. The process of claim 11 wherein the fabrication equipment is a film extruder.

26. The process of claim 11 wherein the fabrication equipment is an injection molder.

27. The process of claim 11 wherein (b) is poly(oxy-1,2-ethanediyl), alpha-(nonylphenyl)-omega-hydroxyphosphate.

28. The process of claim 11 wherein (b) is a polyether acid phosphate.

* * * * *

UNITED STATES PATENT AND TRADEMARK OFFICE
CERTIFICATE OF CORRECTION

PATENT NO.   : 4,857,593

DATED        : August 15, 1989

INVENTOR(S)  : Pak S. Leung et al

It is certified that error appears in the above-identified patent and that said Letters Patent is hereby corrected as shown below:

Claim 6, column 22, line 14, change "ration" to -- ratio --.

Claim 11, column 22, line 50, change "R" to -- R' --; line 67, change "R" to -- R''' --.

Signed and Sealed this

Twenty-sixth Day of June, 1990

*Attest:*

HARRY F. MANBECK, JR.

*Attesting Officer*    Commissioner of Patents and Trademarks